Patented Jan. 7, 1941

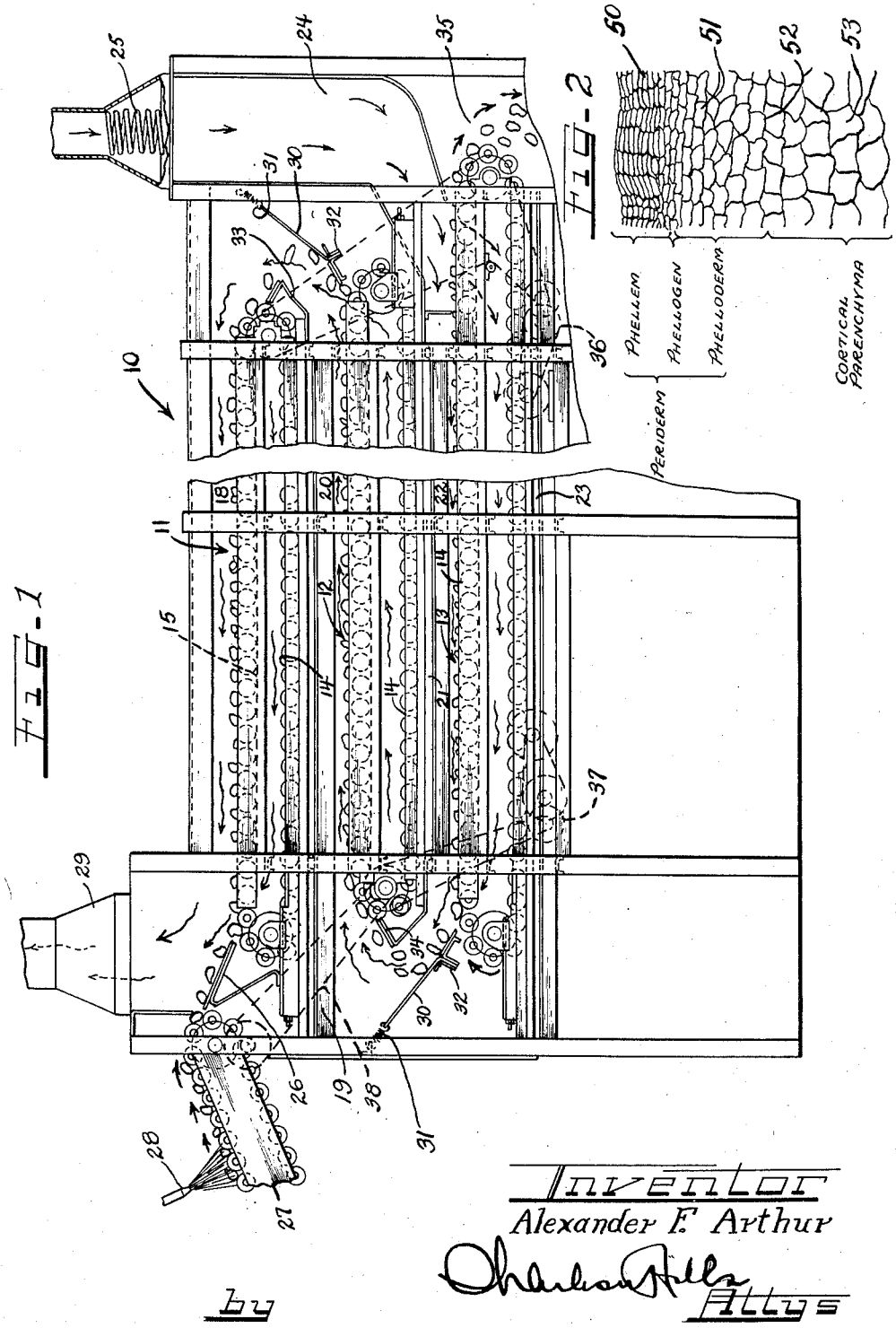

2,228,192

UNITED STATES PATENT OFFICE 2,228,192

PROCESS OF TREATING POTATOES FOR SHIPMENT

Alexander F. Arthur, Homestead, Fla., assignor to F. C. Peters, Inc., Goulds, Fla., a corporation of Florida Original application March 29, 1940, Serial No. 326,618. Divided and this application July 24, 1940, Serial No. 347,139

5 Claims. (Cl. 99—207)

This invention relates to a process of treating potatoes to render them resistant to the formation of soft rot due to the presence of the organism Bacillus carotovous, as well as to a potato having different biological characteristics particularly in its surface layers of cells by reason of it being subjected to my novel process.

The subject matter of this application has been divided from my copending patent application Serial No. 326,618, filed March 29, 1940, entitled "Method of and apparatus for treating potatoes for shipment."

In the past, packers of vegetables such as potatoes have experienced relatively great losses in the transportation of potatoes due to the development of bacterial soft rot. This decay is caused by the organism Bacillus carotovous and its development is favored by the presence of free moisture on the skin of the product.

Attempts have been made to remove this moisture by various treatments, but these treatments prior to the applicant's invention were not found to be very practical or at least weren't ever commercialized.

Heretofore heating of the product has not been considered to be feasible on account of the fact that it was believed that in order to heat the product to an extent sufficient to effect the desirable result the body of the edible or potato would have to be heated to such an extent that it would be deleteriously affected or cooked.

Now I have ascertained that it is feasible to submit potatoes to a relatively high degree of heat which is sufficient to remove deleterious growth forming moisture in the potatoes and yet at the same time not in any way deleteriously affect the body of the potato. I have accomplished this result by first removing free moisture on the surface such as is applied thereto during the moistening or washing of the potato and by then evaporating the moisture from the outer layers of cells of the potato, particularly from the so-called "corky" surface or skin of the potato.

The removal of moisture from the surface of the potato by my process is such that heat may be used, inasmuch as the evaporation of the moisture serves to maintain the main body of starchy cells of the potato cool and substantially unaffected by the heat employed in the processing of the product. At most, the only cells that are affected in the treatment of the potato by my process are the layers of cells directly in the vicinity of the corky outer layer of the potato. The large mass of starchy cells going to make up the inner body of the potato is substantially unaffected by my process as far as I have been able to determine.

It has been definitely found that potatoes treated in accordance with my process will not deteriorate due to soft rot in transit or in storage. As a matter of fact, blanket insurance policies have been issued on potatoes treated by my process guaranteeing them against soft rot while in transit.

It is quite evident that something transpires during the course of my treatment of the potato other than the mere drying of the outer surface of the potato, since otherwise the potato would not be so resistant to the formation of soft rot as is true in the case of potatoes which have been treated by my process. I have endeavored to ascertain exactly what has transpired, and one of the theories advanced is that a biological change occurs by reason of the evaporation of moisture from the outer cells of the potato which results in a greater barrier of moisture free cells through which the organism Bacillus carotovous must penetrate before this organism can have access to the starchy fluid of the potato on which it depends for sustenance. This biological change or phenomena which is believed to occur in the potato as a result of my processing of the same is discussed in detail in the body of the appended detailed description of my invention.

In accordance with the general features of this invention, there is provided a process for treating edibles like potatoes which comprises conveying the moist or washed edibles in a confined area of predetermined size for a predetermined period of time, subjecting the edibles as they travel through the area to heated blasts of air of such volume and temperature as to skin dry the edibles, and utilizing the evaporation of the moisture from the skins of the edibles to preclude undue heating of the main body of starchy cells of the edibles inside the skins.

By the use of the process with these features I have been able to accomplish the objective of this invention which is to so process edibles, and especially potatoes, that the product may be substantially free from the development of soft rot during shipment and whereby the product may be preserved for a relatively long period of time after packing without becoming spoiled.

Other objects and features of this invention will more fully appear from the following detailed description taken in connection with the accompanying drawing which illustrates an apparatus for practicing my process, and in which:

Figure 1 is a side view partly in section and partly broken away, and with parts removed, of an apparatus for practicing the process, and which apparatus is claimed in my aforesaid copending parent application; and Figure 2 is a diagrammatic fragmentary view illustrating on an enlarged scale the cellular make-up of the skin and adjoining portions of a potato.

As shown on the drawing:

It is believed that my novel process will be best understood from an apparatus for practicing the same and which is described in detail hereinafter.

The reference character 10 designates generally a drying chamber or housing in which a product such as potatoes is adapted to be treated in in accordance with the process of my present invention. This chamber 10 may be made of any suitable construction and is of a size sufficient to allow the potatoes to be conveyed therein and subjected to the heated air for a sufficiently great period of time to enable the desired drying of the skin portions of the potato, or, in other words, the portions of the potato at and adjacent the so-called "corky" and "cortex" layers of the potato.

The chamber that I have illustrated is fabricated from metal strips, angle irons, and sheet metal and is preferably of relatively great length such, for example, as forty or more feet, so as to enable the potatoes being conveyed to remain in the heated area for the requisite or allotted period of time. In practice I have found that under the temperature and air conditions employed in this apparatus desirable results are obtained by allowing the potatoes to remain in the chamber for a period of approximately four minutes.

In Figure 1, I have illustrated the chamber as having side panels removed in order to show the construction of the series of conveyors 11, 12, and 13 disposed therein one above the other, and arranged to convey the potatoes in a zigzag or serpentine path through the chamber. These conveyors are each of the endless chain type and are made up of a plurality of rollers 14 which extend transversely of the conveyor. This roller type of endless conveyor may be of any suitable or conventional construction.

The rollers 14 of these conveyors bear against suitable side tracks 15 on the under sides of the rollers, so that as each conveyor advances the rollers are caused to turn on their longitudinal axes, as is well known in the conveyor art. That is to say, each end of these rollers is rotatably journalled and is connected to a suitable endless chain (not shown) trained over suitable end pulleys of the conveyor. Since this conveyor construction is conventional, it is not being illustrated in detail.

Each of the conveyors is disposed in a separate compartment of the housing 10, which compartments are in series connection so that they together define a tortuous or serpentine path through which heated air is adapted to be blown in the treatment of the product. The upper conveyor 11 is positioned in a compartment 18 located above a transverse partition 19. The intermediate conveyor 12 is disposed in a central compartment 20 defined on its top by the transverse or horizontal partition 19 and on its bottom by the horizontal partition 21. The lowermost conveyor 13 is disposed in a bottom compartment 22 defined on its top in part by the partition 21 and on its bottom by the bottom 23 of the housing.

The right hand end of the bottom compartment 22, as shown in Figure 1, is disposed in communication with the downwardly extending air duct 24 through which heated air is delivered into the series of interconnected compartments. This duct 24 may have disposed in it a suitable heating coil such, for example, as steam heating or hot water coils 25 over which a blast of air may be forced by means of any suitable device such, for example, as a blower (not shown). Heating of this air may be suitably controlled by means of conventional thermostatic equipment, which does not per se constitute any part of this invention. I have obtained excellent results with the equipment illustrated by using blasts of air having approximately a temperature of 145° F. upon entry into the chamber 22 and having approximately a velocity of 1200 feet per minute.

At this time it should be noted that the air travels through the tortuous path defined by the compartments 22, 20, and 18 in an opposite direction from the forward travel of the potatoes being conveyed through the heating zone. This arrangement results in the potatoes during their last stage of movement through the drying housing being subjected to the highest temperature and to their being subjected to the least temperature upon their travel through the first or initial heating zone 18. The manner in which this is accomplished will become more evident as the description progresses.

The left hand end of the compartment 22, as illustrated in Figure 1, is connected by a band or turn to the left hand end of the compartment 20. Also, the right hand end of the compartment 20 is connected by a similar turn or bend to the right hand end of compartment 18 at the top of the housing.

As noted before, the upper compartment 18 constitutes a first compartment through which the potatoes entering the apparatus travel, and as a consequence the left hand end of conveyor 11 is positioned to have potatoes discharged thereon by means of an inclined slide 26. This inclined slide or board 26 may be of any suitable construction and has its uppermost end aligned with the discharge end of an endless potato feeding conveyor 27 which extends into a suitable opening in the upper left hand corner of the housing 10. This conveyor may likewise be of any suitable construction and has positioned over it suitable spraying nozzles 28 for moistening and washing the potatoes being lifted to the upper left end of the housing.

The upper left hand end of the housing 10, as illustrated in Figure 1, has connected to it a discharge conduit 29 for conveying the moisture laden air from the housing after the air has traversed the serpentine path defined by the three compartments 22, 20, and 18. This conduit 29 is positioned so as to be in communication with the upper left hand end of the compartment 18 and whereby the air after traversing this last compartment leaves the housing by way of the conduit 29.

The arrows in the compartments 18, 20 and 22, as well as in the conduit 24 and in the conduit 29, indicate the path of the heated air as it traverses through the heating chamber and leaves the same.

In each of the two bends previously referred to, there is disposed a partition member or device for aiding in defining the path of the air and also for serving as a cushioning device against which potatoes leaving the end of an adjoining conveyor are adapted to impinge as they gravitate to the next succeeding conveyor. Since these two devices or partitions are the same, the description of one will suffice for both. Each of these devices comprises a piece of flexible material such, for example, as canvas 30 having an upper end attached by means of springs 31 to a side wall of the housing 10 and having a lower end fastened to a suitable bracket construction 32 extending transversely of the housing and suitably anchored thereto. Referring to Figure 1, it will be perceived that as the potatoes move forward on conveyor 11 toward the right hand end of the housing they drop off the conveyor onto an inclined platform 33 and then gravitate to and impinge against the flexible cushioning canvas 30 which directs the potatoes onto the receiving end of the conveyor 12 which moves in an opposite direction from the conveyor 11.

Similarly, when the potatoes leave the intermediate conveyor 12, they gravitate along an inclined table or platform 34 from which they fall onto the flexible canvas 30 and are delivered or directed by this canvas onto the receiving end of the lowermost conveyor 13 which travels in the same direction as the uppermost conveyor 11. When the potatoes reach the discharge end of this lowermost conveyor, they fall off the conveyor as indicated at 35 and may be distributed onto another conveyor or directly into a packing carton as desired. The purpose of the two flexible canvas partitions 30—30, as noted before, is to direct the forwardly moving stream of hot air from a lower compartment to the compartment disposed immediately thereover and also to serve as a cushioning medium for breaking the fall of the potatoes and to reduce the likelihood of the potatoes becoming bruised as they are discharged from one conveyor to the next succeeding or lower conveyor. Thus, the potatoes are caused to travel in a tortuous or serpentine path in a direction opposite to the tortuous or serpentine path over which the heated air is flowing. Then, too, by reason of the fact that each of the conveyors is disposed wholly in the path of the air, it will be appreciated that the air is caused to flow through the conveyor, as well as on top of it, and the potatoes as they are turned on their respective rollers are hence subjected over their entire outer surfaces to the heating effect of the hot blasts of air.

The endless roller conveyors 11 and 13, since they both travel in the same direction, may be driven by a common driving system shown in dotted lines in Figure 1, and which is designated generally by the reference character 36. This driving system does not per se constitute a part of this invention and, of course, may be of any suitable or conventional construction.

On the other hand, since the conveyor 12 travels in an opposite direction from that of the conveyors 11 and 13, I find it expedient to use a separate drive 37, shown in dotted lines in Figure 1, for effecting motion of this conveyor. Also, if it is so desired, the left hand end of the conveyor 12 may have its supporting shaft connected by a driving system or chain 38, shown in dotted lines in Figure 1, to the supplying or feeding conveyor 27. This arrangement enables the feeding conveyor 27 to be driven by the same driving system as is used for driving the intermediate conveyor 12. It is, of course, to be appreciated that the conveyor 27 may be separately driven by other mechanism, if such an arrangement is more suitable to the particular requirements of a given installation.

As noted before, I have not deemed it necessary to go into all of the details of the conveyors for the respective drives, since these elements of my structure are separately old in the art and may consist equally well of any of the usual or well known driving systems.

The process practiced by this apparatus is believed to be substantially evident from the foregoing description of the apparatus. In brief, as noted before, the blast of air travels in a tortuous path through the three compartments 22, 20, and 18 in an opposite direction from the forward travel of the potatoes through these compartments from the supply conveyor 27 to the discharge point 35. During the course of this travel the potatoes are constantly being turned by reason of the rotation or rolling of the rollers 14, and hence each potato has its entire surface during this course of travel subjected at some time or other to the drying effects of the heated air being circulated through the chamber. This air does not travel entirely over the tops of the conveyors but in reality travels through and all around the conveyors, so that the potatoes get the full benefit of the stream of heated air.

As noted previously, the air may, in accordance with the experience had with this invention, have an initial temperature of approximately 145° F. I find that during the course of the travel of this air through the chamber it loses approximately 45° of this temperature, so that when it reaches the discharge duct 29 it in reality only has a temperature of 100° F. This loss of temperature is, of course, occasioned by reason of the action of the air on the film of moisture on each of the potatoes, or, in other words, is utilized in evaporating this moisture from the skins of the potatoes.

I have ascertained upon examining potatoes leaving the device at point 35 after they have traversed the heated area that the temperature of the body of the potato remains substantially unaltered or, in other words, is substantially the same as it was at the time that the potato entered the chamber. I have also ascertained that during this course of travel approximately half a pound of water may be removed per bushel of potatoes.

Potatoes treated in the foregoing manner resist deterioration for relatively long periods of time, and may be safely shipped without fear of rot or decay. In fact, potatoes thus treated may now be insured against decay or the formation of the so-called "soft rot."

Now, it has been endeavored to ascertain why potatoes treated in accordance with my novel process above described are enabled to resist soft rot during transit and storage. Numerous theories have been advanced as to why this result is accomplished, and I shall hereinafter describe in conjunction with Figure 2 one of the theories which seems to be the most plausible.

As noted before, Figure 2 illustrates diagrammatically on a greatly enlarged scale a fragmentary portion of a potato adjacent the skin or so-called "corky" outer layer of the potato. This corky layer called "phellem" by scientists, which in reality is made up of cells having a different characteristic than other cells of the potato, is designated generally by the reference character 50. Directly below this phellem or corky layer 50 is the phellogen. This layer of cells is of very shallow depth. Inwardly of the cells 51 is another layer of cells 52, designated by scientists as phelloderm. The three layers 50, 51, and 52 are commonly called the periderm of a grown tuber. Disposed inwardly of this layer 52 is a mass of starch cells 53 referred to as the "cortical parenchyma."

In my new process of treating potatoes we have found that in heating the corky layer 50 by the blasts of air evaporation occurs in this layer, as well as in the immediately adjoining layer 51 and that this together with the heat to which the periderm is subjected causes a biological change in the outer layers of cells.

It follows that potatoes treated in accordance with my process are supplied with a number of additional layers of protective cells between the outer surface of the potato and the cortical parenchyma or starchy body 53 of the potato. As a matter of fact, I have ascertained from histological tests of potatoes treated by my present process that the periderm comprising layers 50, 51, and 52 has undergone such a biological change that there is an increase in excess of two layers of cells in the periderm.

It is further well known that the organism *Bacillus carotovous*, which occasions soft rot in a potato, is a motile type of organism in that it depends upon moisture for its movement. That is to say, it is enabled to motivate itself to the starchy part of the potato by reason of the presence of moisture. Hence, the drying of the potato not only kills this bacterial organism but also eliminates from the surface of the potato the moisture on which such organisms depend in order to thrive or exist.

Since these organisms depend for their sustenance upon the starchy cells of the potato or starchy fluids thereof, it follows that if a plurality of additional layers of cells are formed in the periderm of the potato, in which starchy fluids are not present, this organism will have to penetrate the potato to a greater extent in order to get to the parenchyma cells 53 on which it depends for sustenance.

Consistent with the theory discussed hereinabove, it also follows that if by heating the potato the cell layers immediately inside of the potato surface, are partially dried, as well as increased in number, the potato is thus provided with additional barriers to the penetration of the surface of the potato by the soft rot organisms.

It is apparent from the foregoing that in my process I utilize for both the moisture evaporating and potato drying operations heated blasts of air of a temperature such that the air will not cook the potato, or more particularly, the starchy cells thereof. I have with the drying box illustrated in the drawing obtained excellent results by the use of heated air which during the course of its travel through the box has a temperature in excess of 100° F. but short of a temperature which would cause cooking of the edibles or potatoes.

From the foregoing, it is therefore apparent that not only have I provided a new process of treating potatoes for rendering them resistant to the development of soft rot, but in addition thereto I have apparently provided a potato of different biological characteristics in that the surface layers of cells of the potato have been biologically changed during the course of my novel treatment.

I claim as my invention:

1. The process of treating potatoes for shipment and to aid in preventing soft rot during shipment which comprises moistening whole potatoes so that the skin of each potato is covered with a film of moisture adapted to serve during subsequent steps of the process as a heat insulator to prevent cooking of the body of the potato, then conveying the moistened potatoes through a confined area, subjecting the potatoes as they travel through said area to a heated blast of air for a period of time approximating four minutes and of a temperature of substantially 100° to 145° F. and of a velocity of substantially 1200 feet per minute to evaporate the moisture from the skins of the potatoes by skin drying the potatoes and whereby substantially one-half pound of moisture is removed from each bushel of potatoes, and utilizing the evaporation of said moisture to preclude the heating and cooking of the body of the potato.

2. In a process of treating potatoes to aid in preventing soft rot, the steps of disposing the potatoes in a pre-defined area, subjecting the potatoes in said area to a heated blast of relatively high velocity air of a temperature in excess of 100° F. and short of that which would cook the potato to evaporate the moisture from the skins of the potatoes by skin drying the potatoes and utilizing the evaporation of the moisture to preclude undue heating of the starchy body of the potato while at the same time causing the heat to act upon the outer cells of the potatoes as they are dried to cause a biological change in the formation of the outer layers of cells of the potato to render the same resistant to the ingress of soft rot bacteria.

3. In a process of treating raw potatoes to aid in preventing deterioration, the steps of disposing the potatoes in a pre-defined area, subjecting the potatoes in said area for a period of about four minutes to relatively high velocity heated blasts of air at a temperature of approximately 145° F. to skin dry the potatoes at a temperature which would not effect cooking of the starchy bodies of the potatoes, and causing the heat of said air to be imparted to the outer layers of cells of the potatoes as they are dried so as to occasion a biological change in said cells.

4. In a process of treating raw potatoes to aid in preventing deterioration, the steps of conveying the potatoes through a pre-defined area, subjecting the potatoes as they travel through said area to heated blasts of air to dry the outer layers of cells of the potatoes and so that the potatoes are subjected to a maximum heat as they approach the discharge end of the said area and of a temperature of about 145° F. and which will not cook the starchy body of the potato, and causing said heat of said air to act upon the outer cells of the potatoes from which moisture has been removed and prior to the discharge of the potatoes from said area to change the cell construction of the outer layers of cells so as to render them more resistant to the ingress of motile bacteria.

5. In a process of treating raw potatoes to aid in preventing deterioration while preserving the natural appearance of the potatoes, the steps of disposing the potatoes in a predefined area and subjecting each potato uniformly over its entire surface to a large volume of heated relatively high velocity air of a temperature approximately 100° F. for a short period of time sufficient to remove rapidly moisture from the outer and periderm layers of cells of the potato, and just prior to discharge of the potato from said area causing the dried outer cells of the potato to be subjected to a higher temperature short of that which would cook the starchy body of the potato but which will cause a biological change in the formation of the outer and periderm layers of cells of the potato to render the same resistant to the ingress of deteriorating bacteria.

ALEXANDER F. ARTHUR.